(12) United States Patent
Son-Bell et al.

(10) Patent No.: US 7,813,964 B2
(45) Date of Patent: Oct. 12, 2010

(54) CLICK AND RUN SOFTWARE PURCHASING

(75) Inventors: Mark A. Son-Bell, Los Altos, CA (US);
Gregory A. Williams, Colorado Springs, CO (US); Arieh Markel, Lafayette, CO (US); Carl F. Meske, Jr., San Jose, CA (US); Peter H. Schow, Longmont, CO (US)

(73) Assignee: Oracle America, Inc., Redwood City, CA (US)

( * ) Notice: Subject to any disclaimer, the term of this patent is extended or adjusted under 35 U.S.C. 154(b) by 1316 days.

(21) Appl. No.: 11/326,864

(22) Filed: Jan. 6, 2006

(65) Prior Publication Data

US 2007/0162346 A1    Jul. 12, 2007

(51) Int. Cl.
*G06Q 30/00* (2006.01)
(52) U.S. Cl. .......................................... 705/26; 705/37
(58) Field of Classification Search ............. 705/26, 705/37
See application file for complete search history.

(56) References Cited

U.S. PATENT DOCUMENTS 5,892,900 A *  4/1999  Ginter et al. ................. 726/26
6,687,745 B1 *  2/2004  Franco et al. ............... 709/219

2006/0047716 A1  3/2006  Keith

OTHER PUBLICATIONS

Cyrus Intersoft Unveils Strategy for Serving ASPs. PR Newswire, New York, Nov. 2, 1999, downloaded from ProQuest Direct on the Internet on Sep. 27, 2009, 4 pages.*
Louise Morrison, ASP . . . and you shall receive net technology delivers services without software Denver Post, Denver Colorado, Mar. 20, 2000, downloaded from ProQuest Direct on the Internet on Sep. 27, 2009, 4 pages.*
Trellix Announces Breakthrough for Sharing Multiple HTML Files Via E-Mail, Business/Technology Editors. Business Wire. New York: Mar. 17, 1998. p. 1, downloaded from ProQuest Direct on the Internet on Jun. 15, 2010, 4 pages.*

* cited by examiner

*Primary Examiner*—James Zurita
(74) *Attorney, Agent, or Firm*—Osha • Liang LLP

(57) ABSTRACT

A method for selling and executing an application using a remote file system for a plurality of clients that includes receiving a purchase request for the application from a client of the plurality of clients, adding an application icon to the remote file system for the client, wherein the application icon allows access to the application and wherein the application icon is added after receiving the purchasing request, receiving an execution request for the application, wherein the execution request is received when the client accesses the application icon, and initiating execution of the application from the remote file system for the client, wherein the application is executed by the client from the remote file system.

20 Claims, 4 Drawing Sheets

CLICK AND RUN SOFTWARE PURCHASING

CROSS-REFERENCE TO RELATED APPLICATIONS

The present application contains subject matter that may be related to the subject matter in U.S. patent application Ser. No. 11/323,735, entitled "Targeted Automatic Patch Retrieval" filed on Jan. 6, 2006 and assigned to a common assignee, and U.S. patent application Ser. No. 11/327,063, entitled "System for Providing Managed Computing Service" filed on Jan. 6, 2006 and assigned to a common assignee.

BACKGROUND

A typical large entity, such as a company, educational institution, or other organization, has thousands of computer systems to manage. Each computer system in the large entity may execute dozens of applications (i.e., software), such as operating system applications, networking applications, database applications, as well as any other type of applications that may exist. Typically, in order to execute an application, the application, or portion thereof (e.g., the client component of a database), must be installed directly on the computer system after obtaining the license for the application.

One common method for installing software on a computer system is for a user to buy an application in a retail store, insert the disk (e.g., floppy disk, CD-ROM, etc.) in a disk drive and execute each of the various configuration steps at the computer on which the software is being installed. The configuration steps typically include such tasks as accepting a license agreement, determining which location to store the software, determining the portion of the software should be installed (e.g., minimal installation, typical installation, or complete installation), determining any extra components to install, and waiting for the installation to complete.

Another possible method for installing software is to obtain the license for the software via the wide area network, download an executable file with the software, open the downloaded file and follow various configuration steps, such as those stated above.

In a large entity, rather than having a user access the computer system directly (i.e., sit at a terminal of the computer system) to install the software, a user or administrator may purchase multiple licenses (i.e., one for each computer system on which the software is to be installed) for the software and provision the software on each computer system. Provisioning software is a method of remote installation of software. Provisioning the software typically involves an administrator with the software located on one computer system, selecting a second computer system on which the software is to be installed, selecting a configuration profile, and starting the installation of the software on the second computer system. The administrator must perform the aforementioned operations for each computer system on which the software is to be executed. Only when the software is installed on a particular computer system may the software be executed.

SUMMARY

In general, in one aspect, the invention relates to a method for selling and executing an application using a remote file system for a plurality of clients that includes receiving a purchase request for the application from a client of the plurality of clients, adding an application icon to the remote file system for the client, wherein the application icon allows access to the application and wherein the application icon is added after receiving the purchasing request, receiving an execution request for the application, wherein the execution request is received when the client accesses the application icon, and initiating execution of the application from the remote file system for the client, wherein the application is executed by the client from the remote file system.

In general, in one aspect, the invention relates to a system for selling an application and permitting execution of the application for a plurality of clients that includes a remote file system for storing an application icon, and an e-commerce engine accessing the remote file system and for receiving a purchase request for the application from a client of the plurality of clients, adding the application icon to the remote file system for the client, wherein the application icon allows access to the application and wherein the application icon is added after receiving the purchasing request, receiving an execution request for the application, wherein the execution request is received when the client accesses the application icon, and initiating execution of the application from the remote file system for the client, wherein the application is executed by the client from the remote file system.

In general, in one aspect, the invention relates to a computer system for selling and executing an application for a plurality of clients that includes a remote file system for storing an application icon, and a processor within the computer system for executing software instructions to receive a purchase request for the application from a client of the plurality of clients add the application icon to the remote file system for the client, wherein the application icon allows access to the application and wherein the application icon is added after receiving the purchasing request, receive an execution request for the application, wherein the execution request is received when the client accesses the application icon, and initiate execution of the application from the remote file system for the client, wherein the application is executed by the client from the remote file system.

Other aspects and advantages of the invention will be apparent from the following description and the appended claims.

DETAILED DESCRIPTION

Figure 1:
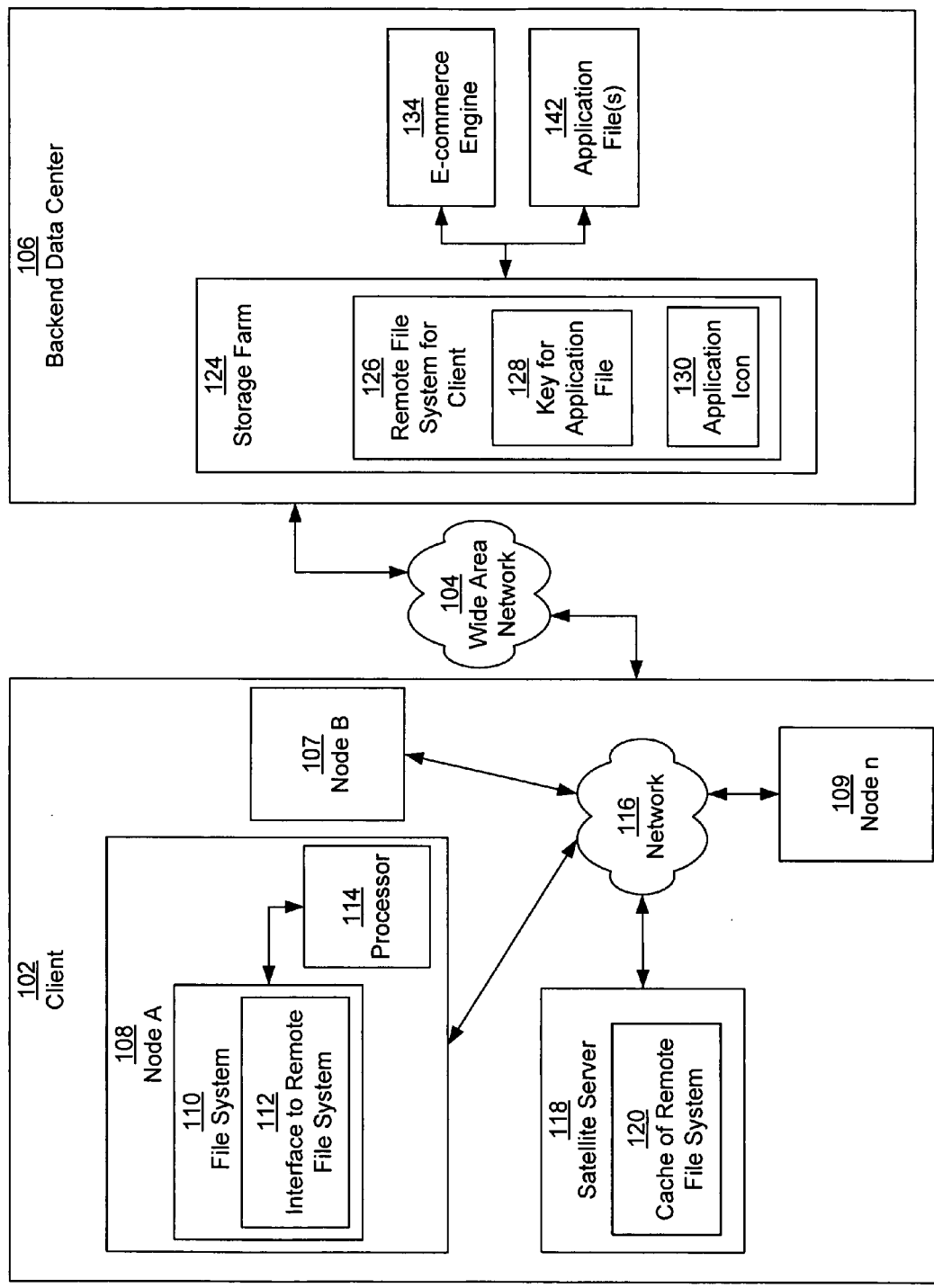
FIG. 1 shows a flow diagram of a system for click and run software purchasing in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for click and run software purchasing. Specifically, a user may click (i.e., choose) software to purchase, and run (i.e., execute) the purchased software without performing installation steps. More specifically, embodiments of the invention use a remote file system whereby software is executed from the remote file system. Accordingly, in one or more embodiments of the invention, in a first step, a user may simply purchase the software and in a second step execute the software from the remote file system without performing the installation.

FIG. 1 shows a flow diagram of a system for click and run software purchasing in accordance with one or more embodiments of the invention. The system includes a client (102) connected to a backend data center (106) via the wide area network (104) (e.g., the Internet). Each of these components is described in detail below.

As shown in FIG. 1, the client (102) includes a node (e.g., node A (108), node B (107), node n (109)), a network (116), and satellite server (118). Each of these components is described in detail below.

A node (e.g., node A (108), node B (107), node n (109)) corresponds to any type of computing device, such as a laptop computer, personal digital assistant, server, desktop computer, etc. At least one node (e.g., node A (108)) on the client (102) includes a file system (110) and a processor (114).

The file system (110) may correspond to a file system for the entire client (102) or only for the node (e.g., node A (108), node B (107), node n (109)). In one or more embodiments of the present invention, the file system (110) includes an interface to a remote file system (112). The interface to the remote file system (112) provides access to the remote file system for the client (126) (described below). Specifically, in one or more embodiments of the invention, as part of a directory structure for the file system (110) appears the remote file system. For example, a node may have a file system (110) with a "c:" drive which corresponds to a local hard drive, an "a:" drive which corresponds to a local floppy drive, and an "e:" drive which corresponds to the interface to remote file system (112). Accordingly, in one or more embodiments of the invention, an administrator or application may access files on the remote file system for the client (126) using a similar interface (e.g., user interface (UI) or application programming interface (API)) provided for accessing files on a local disk. Thus, in accordance with one or more embodiments of the invention, the remote file system for the client (126) is simultaneously visible to both the client (102) and the backend data center (106).

Continuing with FIG. 1, a processor (114) is connected to the file system (110). The processor (114) includes functionality to receive all or a portion of an application from the backend data center (106) and execute the application. Specifically, because the file system (110) includes an interface to the remote files system (112) and therefore allows access to the remote file system, processor (114) may access the application during execution of the application as if the application were stored locally (i.e., on node A (108)).

Those skilled in the art will appreciate that the node (e.g., node A (108), node B (107), node n (109)) may not be located within the parameters of client (102). Specifically, the node (e.g., node A (108), node B (107), node n (109)) may correspond to a laptop computer of a user in transit. Accordingly, in one or more embodiments of the invention, the node (e.g., node A (108), node B (107), node n (109)) may be directly connected to the wide area network (104).

However, when the node (e.g., node A (108), node B (107), node n (109)) is within parameters of the client, a network (116) may be used to connect the nodes (e.g., node A (108), node B (107), node n (109)). The network (116) may correspond to any type of mechanism for connecting nodes (e.g., node A (108), node B (107), node n (109)). Specifically, the network (116) may correspond to direct connections between the nodes (e.g., node A (108), node B (107), node n (109)), one or more local area network (LANs), wide area networks (WANs), or other such connecting mechanisms.

Connected to the nodes (e.g., node A (108), node B (107), node n (109))) via a network (116) is a satellite server (118). The satellite server (118) is a server which includes functionality to maintain a cache of the remote file system (120) for the client (102). The cache of the remote file system (120) maintains data recently accessed by the client (102). Accordingly, the satellite server (118) may include a synchronization protocol for synchronizing files between the cache for the remote file system (120) and the remote file system for the client (126). Having a cache for the remote file system (120) reduces bandwidth requirements and increases the availability for the remote file system for the client (126) on the client (102). Alternatively, those skilled in the art will appreciate that the cache for the remote file system (120) may not exist or may be stored in the node (e.g., node A (108), node B (107), node n (109)).

Continuing with FIG. 1, connected to the client (102) is the backend data center (106). In one or more embodiments of the invention, the backend data center (106) corresponds to a group of connected servers (not shown) that include functionality to accept orders for one or more applications and allow access to the application(s). Components of the backend data center (106) may be physically located together (e.g., in the same building) or physically dispersed. The backend data center (106) includes a storage farm (124), an e-commerce engine (134), and an application (142). Each of these components is described below.

The storage farm (124), in one or more embodiments of the invention, corresponds to at least one server that manages remote files for several clients (e.g., client (102)). A remote file (e.g., key to application file (128), application icon (130)) corresponds to a file which is not stored on the client (102). Specifically, in one or more embodiments of the invention, each client (e.g., client (102)) has a remote file system (126) for the client ((e.g., client (102))) at the storage farm (124).

The application icon (130) corresponds to a user visible link to an application. By accessing and executing the application icon (130), the application executes. Specifically, the application icon (130) provides a virtual link to the key for the application (128).

In one or more embodiments of the invention, the remote file system (126) stores a key to an application (128). The key for the application (128) may correspond to the executable file for the application or to a direct or indirect reference to the application executable. Additionally, in one or more embodiments of the invention, the key for the application (128) provides the access rights for the client (102). Specifically, the key for the application may specify a computer system on the client (102) which may access the application, and any authorization/authentication parameters required. The key may also specify a particular portion of the application for which a user at the client (102) may access. For example, the key for the application (128) may specify that a user only has access to a trial version which offers less functionality. Accordingly, the key for the application (128) allows access to all or some of the application files (142).

The application file(s) (142), in one or more embodiments of the invention, correspond to the files required for executing an application. The application may correspond to any type of software, such as word processing, database, networking, email software, and other such software. Further, in one or more embodiments of the invention, there may exist multiple versions of the same application. In such scenario as having multiple versions, each version may be specific to a particular edition (i.e., professional edition, student edition, trial edition, etc.), operating system type, historical version, etc.

Continuing with FIG. 1, connected to the storage farm and the application files is an e-commerce engine (134). In one or more embodiments of the invention, the e-commerce engine (134) allows for purchasing of an application. Specifically, the e-commerce engine (134) may include one or more web servers for servicing web pages (not shown) for purchasing an application using the wide area network and any backend servers, such as database servers, for accepting orders. Alternatively, the e-commerce engine (134) may correspond to any type of device for servicing an order for an application, including a call center for accepting phone orders from the client (102).

Figure 2:
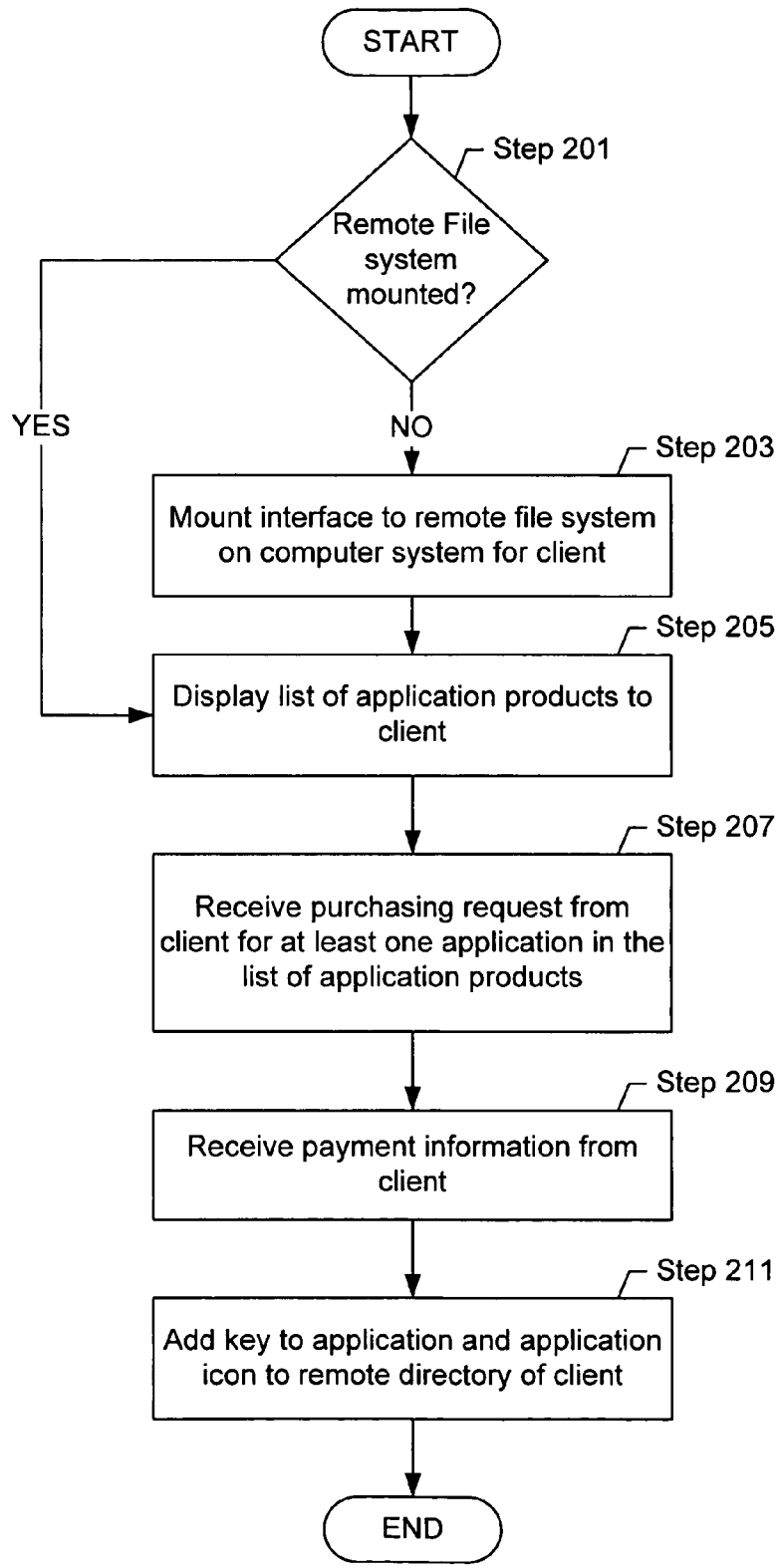
FIG. 2 shows a flowchart of a method for obtaining software using click and run software purchasing in accordance with one or more embodiments of the invention.

FIG. 2 shows a flowchart of a method for obtaining software using click and run software purchasing in accordance with one or more embodiments of the invention. Initially, a determination is made whether the remote file system is mounted (Step 201). If the remote file system is not mounted, then an interface to the remote file system is mounted (Step 203). At the backend data center, mounting the remote file system may be performed by adding computer system and user specific information to a directory for the computer system and user. At the client, in one or more embodiments of the invention, mounting the remote file system may be performed centrally rather than accessing each computer system on which the interface to the remote file system exists. Specifically, a user or administrator typically does not need to specify each node on which to mount the remote file system for the client. Once the remote file system for the client is mounted, then at startup, a file system manager is able to discover the remote file system for the client and add the remote file system interface to the file system. Accordingly, when a computer system boots or a user logs in, the file system automatically finds and mounts the user's/computer system's customized folder. Those skilled in the art will appreciate that once the remote file system is mounted for a particular user or computer system, mounting the remote file system does not need to be performed again.

Continuing with FIG. 2, after having the remote file system mounted, next a list of applications is displayed for the client (Step 205). Displaying a list of applications may be performed using a standard web commerce website in accordance with one or more embodiments of the invention. After displaying a list of applications for a client, a purchasing request is received from the client for at least one application in the list of applications (Step 207). Specifically, the user may submit a purchasing request by typing in the name of the application, clicking on an icon in an wide area network browser, etc. After making the purchasing request, typically, a user checks out and payment is received for the application (Step 209).

In an alternative embodiment, Step 207 and Step 209 may be combined into a single step. Specifically, in one or more embodiments of the invention, clicking on the application in the list of applications also pays for the application. Accordingly, with one click of the mouse the user has access to the application.

In another embodiment of the invention, rather than using a web commerce website to purchase an application, the remote file system may be used to purchase the application. Specifically, the user may submit an order for an application by saving the order to the remote file system. Upon receiving the order by the backend data center, a listener at the backend data center may submit the order to the e-commerce engine. Payment for the application may be received on a contractual basis, saved with the order, etc.

Returning to FIG. 2, after payment is received for the application, then a key for the application and an application icon is added to the remote file system of the client (Step 211). The key for the application and the application icon allow a user to access and execute the application.

Figure 3:
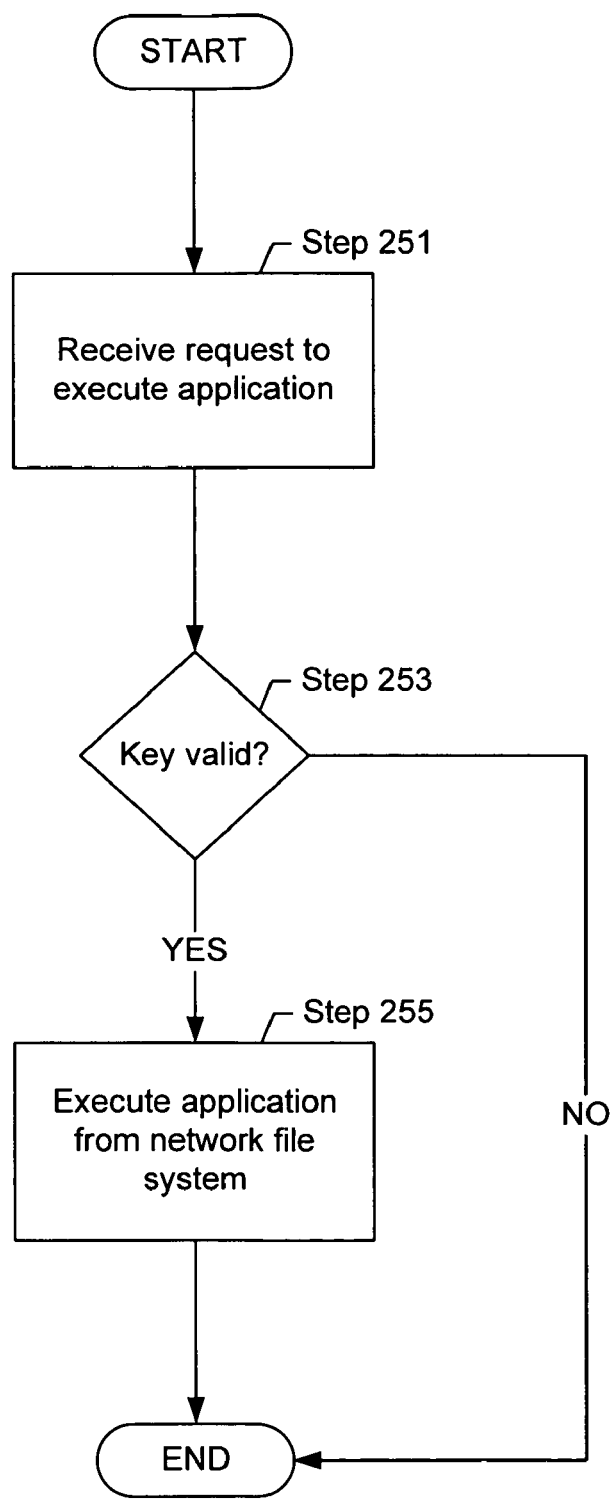
FIG. 3 shows a flowchart of a method for executing software using click and run software purchasing in accordance with one or more embodiments of the invention.

FIG. 3 shows a flowchart of a method for executing an application using click and run software purchasing in accordance with one or more embodiments of the invention. Initially, a request is received to execute the application (Step 251). Typically, a request is received by a user clicking on an application icon in the remote file system of the client. For example, a user may access the drive that corresponds to the remote file system. Then the user may click on an icon in the drive corresponding to the remote file system. Those skilled in the art will appreciate that the user may also click on a shortcut icon or perform any action known in the art for submitting a request to execute an application when the application is local.

After receiving a request for the application, a determination is made whether the application key is valid (Step 253). If the application key is not valid, then the user is not permitted to execute the application. Determining whether the key is valid includes determining whether the user has permission to access the application. If the key corresponds to the application executable, then the key may be determined as valid if the key exists.

Alternatively, the key may include a reference to a table which specifies access parameters for the application. Specifically, the key may correspond to a unique identifier in the table that specifies whether a specific user has access to the application or a portion of the application using a particular node or from a particular client at the time in which the application icon is accessed. If the node, user, or client matches the parameters specified in the table, then the key is valid.

Alternatively, the key may provide an indirect reference to the application executable through the table. Specifically, the key may provide a unique identifier in the table. If the unique identifier in the table is valid, then the table may return a reference to the application executable. Those skilled in the art will appreciate that multiple mechanisms exist for determining whether a user may access an application using a key.

By checking whether the application key is valid, embodiments of the invention provide a way to manage licenses of an application. Specifically, the license for the application may be checked by the backend data center. For example, the backend data center is completely able to manage how trial versions are executed. Further, using a application key provides a mechanism for having a subscription service for the application. Thus, the e-commerce engine may regulate the use of the application. Specifically, for each use of the application, the e-commerce engine is able to charge the account of the application.

Continuing with FIG. 3, alternatively, if the application key is valid, then the application is executed from the network file system (Step 255). Execution of the application may be performed by submitting sections of the application binary to the client. The section of the application binary is then executed by the client. While executing the section of the application binary, another section may be requested.

For example, on a cache miss or a page fault, the client may request a new portion of the application from the backend data center. The new portion replaces an existing block or page. Specifically, when the next instruction is not on a cache, the next instruction and surrounding instructions are obtained from the remote file system. Accordingly, execution may be performed as if the application were stored locally on the client. Those skilled in the art will appreciate that because of the principle of locality, most of the execution will exist within the same area of memory. Thus, the execution of the application remotely typically will not severely degrade performance.

Further, one skilled in the art will appreciate that because communication between client and the backend data center is typically performed using the wide area network, various other security measures may be performed that are not shown in FIG. 2 and FIG. 3. For example, firewalls on both the client and the backend data center may be used to prevent intruders, data may be encrypted and decrypted using virtually any mechanism known in the art, as well as any of the other myriad of security measures known in the art.

Figure 4:
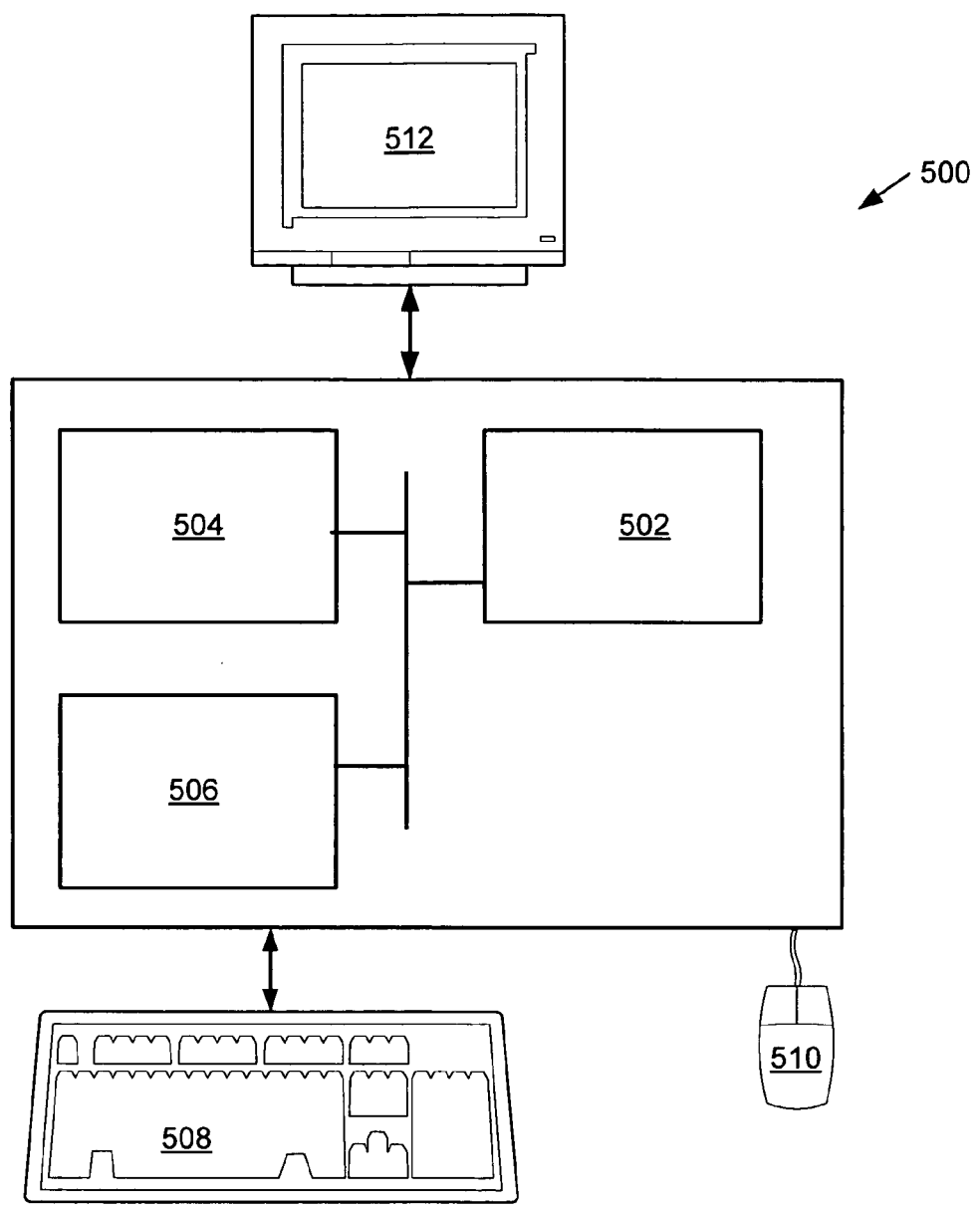
FIG. 4 shows a computer system in accordance with one or more embodiments of the invention.

The invention may be implemented on virtually any type of computer regardless of the platform being used. For example, as shown in FIG. 4, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., processor, file system, remote file system, e-commerce engine, application file, and any other components) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention may include one or more of the following advantages. First, embodiments of the invention provide wide area network wide availability of applications. Specifically, because an application is physically located on an wide area network scale file system, the application is available to the user from anywhere in which the user has access to the wide area network, regardless of the user's physical location or particular desktop computer. Further, embodiments of the invention allow a user to purchase and execute software without requiring the user to download the software, perform installation or configuration steps.

Additionally, embodiments of the invention provide a mechanism whereby the backend data center, rather than the user, is responsible for maintaining the application. Specifically, for each patch that is created for the application, the backend data center may install the patch for all clients that use the application. Accordingly, the clients do not need to know when a patch is available or how to install patches.

Further, embodiments of the invention provide a mechanism for e-commerce which allows for managing of licenses and provides a mechanism for subscription service applications. Specifically, licenses may be managed by the backend data center, thereby preventing a user from obtaining access to the application by manipulating the user's computer. The e-commerce engine may also charge the user for each execution of the application.

Accordingly, embodiments of the invention provide a less error-prone, easier purchase and execution of applications thereby providing a better user experience. Further, embodiments of the invention allow a large client to obtain the benefits of a managed application for all nodes of the client without the requirement that the client perform the management.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for selling and executing an application located on a remote file system for a client, comprising:
   receiving a purchase request for the application from a computer system of the client, wherein the computer system is a node of a plurality of nodes of the client, wherein the computer system includes an interface to the remote file system and a processor, and wherein the interface mounts the remote file system as part of a local file system of the computer system;
   adding an application icon to the remote file system, wherein the application icon allows execution of the application, and wherein the application icon is added to the remote file system after receiving the purchase request;
   receiving an execution request for the application from the computer system, wherein the execution request is received when the computer system accesses the application icon; and
   initiating execution of the application from the remote file system, wherein the application is executed by the computer system from the remote file system, and wherein the application is accessed by using the local file system.

2. The method of claim 1, further comprising:
   adding a key for the application to the remote file system, wherein the key specifies that the computer system has permission to access the application.

3. The method of claim 2, wherein the key is an executable file for the application.

4. The method of claim 2, wherein the key is a reference to a table.

5. The method of claim 4, wherein the table references an executable file for the application if the key is valid.

6. The method of claim 2, wherein the key specifies a version of the application that the client has permission to access.

7. The method of claim 1, wherein the client is one of a plurality of clients, and wherein access to the remote file system is limited to the plurality of nodes of the client.

8. The method of claim 7, wherein access to the application icon is limited to the plurality of nodes of the client.

9. The method of claim 1, wherein the application is executed from the remote file system by the processor of the computer system.

10. A system for selling an application and permitting execution of the application for a client, comprising:
- a remote file system storing the application; and
- an e-commerce engine accessing the remote file system and configured to perform the steps of:
  - receiving a purchase request for the application from a computer system of the client, wherein the computer system is a node of a plurality of nodes of the client, wherein the computer system includes an interface to the remote file system and a processor, and wherein the interface mounts the remote file system as part of a local file system of the computer system;
  - adding the application icon to the remote file system, wherein the application icon allows execution of the application, and wherein the application icon is added to the remote file system after receiving the purchase request;
  - receiving an execution request for the application from the computer system, wherein the execution request is received when the computer system accesses the application icon; and
  - initiating execution of the application from the remote file system, wherein the application is executed by the computer system from the remote file system, and wherein the application is accessed by using the local file system.

11. The system of claim 10, wherein the remote file system further stores:
- a key for the application,
- wherein the key specifies that the computer system has permission to access the application.

12. The system of claim 11, wherein the key is an executable file for the application.

13. The system of claim 11, wherein the key is a reference to a table.

14. The system of claim 13, wherein the table references an executable file for the application if the key is valid.

15. The system of claim 11, wherein the key specifies a version of the application that the client has permission to access.

16. The system of claim 10, wherein the client is one of a plurality of clients, and wherein access to the remote file system is limited to the plurality of nodes of the client.

17. The system of claim 16, wherein access to the application icon is limited to the plurality of nodes of the client.

18. The system of claim 10, wherein the application is executed from the remote file system by the processor of the computer system.

19. A computer system, comprising:
- a local file system;
- an interface to a remote file system storing an application, wherein the interface mounts the remote file system as part of the local file system;
- a processor; and
- a computer readable storage medium having computer readable program code embodied therein, the computer readable program code adapted to, when executed by the processor, implement a method, the method comprising:
  - sending a purchase request for the application;
  - requesting execution of the application, by accessing an application icon stored on the remote file system, wherein the application icon is stored on the remote file system in response to the purchase request; and
  - executing the application from the remote file system, wherein the application is accessed by using the local file system.

20. The computer system of claim 19, wherein the application is executed from the remote file system by the processor.

* * * * *